Figure 1:
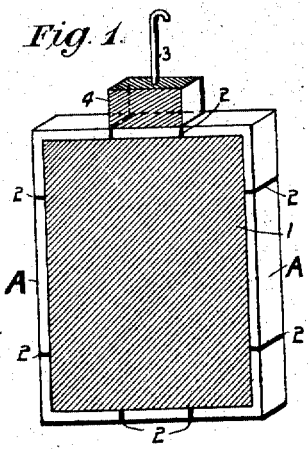

F. I. GIBBS.
PROCESS FOR PRODUCING ARTICLES BY ELECTRODEPOSITION.
APPLICATION FILED SEPT. 23, 1909.

984,760.

Patented Feb. 21, 1911.
2 SHEETS—SHEET 1.

Witnesses.
W. P. Burke
A. F. Houman

Inventor
Frank Iorns Gibbs
ATTY

F. I. GIBBS.
PROCESS FOR PRODUCING ARTICLES BY ELECTRODEPOSITION.
APPLICATION FILED SEPT. 23, 1909.
984,760.
Patented Feb. 21, 1911.
2 SHEETS—SHEET 2.
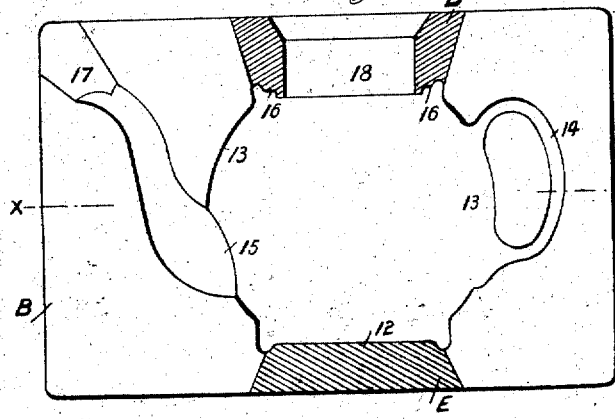
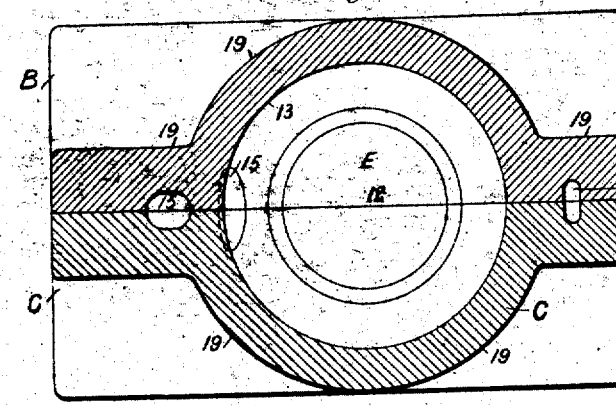
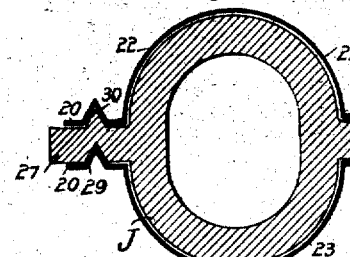
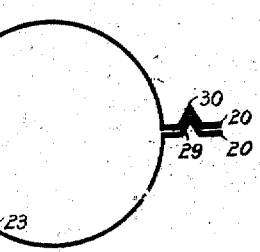
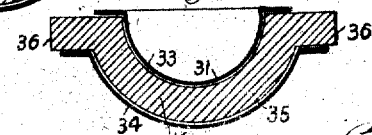
Witnesses.
W. P. Burke
A. F. Heuman
Inventor.
Frank Ivins Gibbs

UNITED STATES PATENT OFFICE.

FRANK IORNS GIBBS, OF BIRMINGHAM, ENGLAND.

PROCESS FOR PRODUCING ARTICLES BY ELECTRODEPOSITION.

984,760.           Specification of Letters Patent.      Patented Feb. 21, 1911.

Application filed September 23, 1909. Serial No. 519,243.

*To all whom it may concern:*

Be it known that I, FRANK IORNS GIBBS, a subject of His Majesty the King of Great Britain and Ireland, residing at 140 Hurst street, Birmingham, England, manufacturer, have invented new and useful Improvements in Processes for Producing Articles by Electrodeposition, of which the following is a specification.

This invention has reference to improvements in processes for the production of all those metallic articles and combined metallic and non-metallic articles which can be produced by electro-deposition on to a prepared surface, said articles being entirely metallic, or combined metallic and non-metallic, as hereinafter described. Heretofore, when depositing metal on to the surface of a non-metallic article such as the surface of potteryware, or glass, or bricks, or slabs, such surface must first be coated with plumbago or with some metallic paint or other metallic preparation which will receive the deposit and such coating will be more or less absorbed into and form part of the metallic electrodeposit thereon, and therefore it follows that when the deposit has been removed from the non-metallic article which has served as the model, the surface of the same must be recoated with the plumbago or metallic paint or special preparation before it can be used again for another deposit.

My invention enables the glass or potteryware or burnt clay model or article to have metal electro-deposited on to its surface or surfaces and removed therefrom over and over again without such surface having to be re-prepared by the plater in any way, and moreover the surface of the deposit which was next to the surface of the model or article will, when the deposit is removed therefrom, be beautifully smooth and highly polished.

In carrying out this invention the surface, or the parts of the surface, of the article of glass or potteryware or the brick or burnt clay slab or tile or the like (all hereinafter referred to as the model) on to which the metal is to be electro-deposited, is or are coated as by the potter with a glazed metallic luster, preferably a platinum luster, or it may be silver luster, or gold luster, or copper luster, or a glazed luster surface prepared with any other suitable metal in the same way that well known glazed luster potteryware is now coated or made. The copper or other metal is now electro-deposited on to the glazed luster surface of the model to the required thickness and when this required thickness has been obtained the deposit can be removed from the model and it will be found that the deposit has not adhered to the glazed luster surface and therefore the deposit can be very readily removed and the surface of the deposit which was next to the model will, by having been in contact with the glazed metallic luster surface, be beautifully polished and free from all tarnish, and practically chemically clean. Thus the expense of polishing and the polishing materials and the liquid cleaning and cleaning materials and the like is saved. This polished surface of the deposited metal article is also if desired ready for a thin coat of a noble metal or other metal or metal coloring or, being free from all dust and blemishes, can be lacquered in the ordinary way. When the glazed luster surface model from which the deposit has been removed has been carefully cleaned and swilled and free from finger marks and other impurities, it is in the same condition as when it first entered the bath for the previous deposit and is now ready for another deposit. Thus the model can be used over and over again as it and its luster surface are practically indestructible and the luster surface always remains untarnished ready for another deposit. For obtaining good results it is important that the glazed metallic luster surface has been properly and carefully put on the model by the potter so that there are no pin holes or breaks in the glazed luster surface.

My invention enables me to produce among other metal articles highly polished metal in sheets and strips, and in the form of perforated or other strips commonly known as ornamental wire and used in the electro-plate trade, such metal articles being entirely of one metal or two or more metals deposited one on the other. For instance in making sheet metal which is highly polished on one side I employ a potteryware or other non-porous baked clay glazed slab or block with a level surface coated with the said glazed metallic luster and this forms the model, or the model is formed of a piece of plate glass or thick sheet glass which is coated with the said glazed metallic luster and this model is inserted in the bath and properly connected up and the metal deposited on to the glazed luster surface to the desired thickness, and then when the model has been removed from the bath and washed and dried the deposit can readily be lifted off the glazed metallic luster surface of the model by inserting a knife at one edge or corner when it will readily peel or lift off, because as aforesaid the deposit does not adhere to the said glazed luster surface. This sheet metal will now be found to have a splendid highly polished surface which was next to the luster, and it is ready for use in the various arts in which polished sheet metal is required. In making said sheet metal I prefer to use a model which has two or more of its sides covered with the glazed metallic luster so as to form a corresponding number of sheets of metal at the same time.

Figure 2:
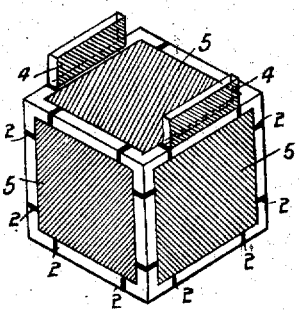
Figure 3:
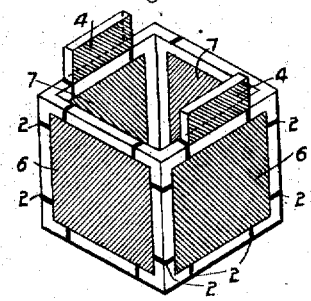
Figure 4:
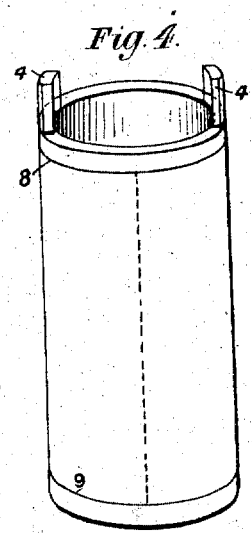
Figure 5:
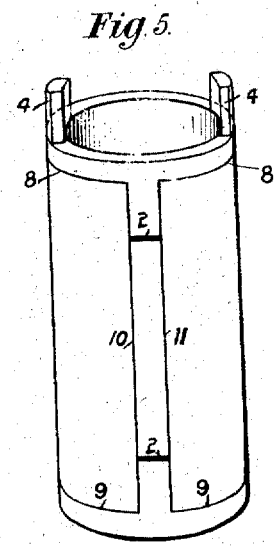
Figure 6:
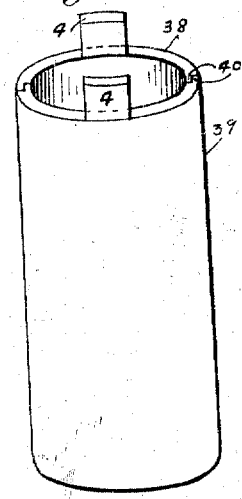

In the accompanying drawings, Figure 1 illustrates the method of forming two metallic sheets simultaneously. Fig. 2 illustrates the method of forming six metallic sheets simultaneously. Fig. 3 illustrates a method of forming eight metallic sheets simultaneously. Figs. 4, 5, and 6 illustrate a method of forming curved or cylindrical sheets of metal. Fig. 7 is an elevational view of one section of a mold employed for forming a tea pot in accordance with my invention. Fig. 8 is a sectional view on the line x—x of Fig. 7, the two sections of the mold being shown in operative position to one another.
Fig. 9 is a sectional view of the mold illustrating the process of forming metal plates with flanges, which plates are provided with inner polished surfaces. Fig. 10 is a view similar to Fig. 9 showing the means of forming flange plates having exterior or outer polished surfaces. Fig. 11 is a view similar to Fig. 9 showing the mold in one piece instead of in two pieces. Fig. 12 represents the manner of joining together the two plates formed as indicated in Fig. 11. Fig. 13 illustrates the method of forming simultaneously two flange plates, one of which is provided with an inner polished surface and the other of which is provided with an outer polished surface.

On the accompanying drawings Fig. 1 is a projected view of a slab or block forming the model for producing simultaneously two sheets of metal, this block or model is marked A and it will be seen that it is of rectangular form somewhat larger than the required sheets. Its back and front surfaces (of which only the front surface can be seen) are partly coated at 1 (as shown by cross shading) with the glazed metallic luster, and from this surface 1 to the corresponding surface on the other side of the model there are leads 2 which act as leads for the current, so that the metal will be deposited on to said surfaces as well as on to the strips or leads 2 around the edges of the model from one sheet to the other and these leads can be cut away when the deposit is finished and the sheets are to be removed. The leads 2 assist in securing the sheets to the luster surface of the model while the outer surfaces of the sheets are polished if desired; the copper rod 3 connected to the luster ware projecting part 4 of the model is for the purpose of connecting the current. When the sheets are removed from the model the surfaces which were in contact with the metallic luster surface will be beautifully smooth and polished as aforesaid. Or if the model has an embossed or recessed luster surface then the sheet metal will have a similar form. When it is required for the deposited metal to be perforated then this can be done in two ways, either by the glazed metallic luster being put on to the surface of the model by the potter in the desired pattern so that the metal when deposited on to the glazed metallic luster surface will have the required perforated or other pattern, or the whole of the surface can be coated with the metallic luster, and the parts corresponding with the perforations in the finished metal can be stopped off on the luster surface so that the metal will be deposited only on to the exposed surface and in the required perforated or other pattern.

It will be understood that the deposited metal can be made of any desired thickness and that when very thin it takes the form of metal foil or tinsel, or the said thin deposited sheet metal when removed from the model which has a recessed or raised surface can be used as embossed metallic wall paper. Also one or more metals can be deposited one on the other. For instance assuming that a metal sheet is required which consists of a polished silver face strengthened by a copper back, then the silver is first deposited upon the glazed luster surface model and when the desired thickness has been obtained then this is strengthened by copper being deposited on it which may if desired have silver deposited on the copper and polished in the usual way. Or other combinations of these metals or other metals may be arranged as will readily be understood. Moreover the metal or metals which is or are deposited on to the metal which was first deposited on to the glazed luster ware surface may be so deposited as to form an ornamental surface like marquetry or Damaskeen work as will readily be understood.

It will be evident that the luster ware models for the production of the sheet metal in the manner above described may be made of many other shapes than that shown by Fig. 1 within the scope of this invention; some of these luster ware models are by way of examples illustrated in Figs. 2, 3, 4, 5 and 6. The luster ware block shown in Fig. 2 has six flat luster ware sides 5, (only three of which can be seen) so as to produce six sheets simultaneously and these luster ware parts are connected together by glazed luster leads 2 to convey the current to all of them. The model shown in Fig. 3 is made like a hollow rectangular prism open at both ends so that in this case eight sheets will be deposited simultaneously four on the four outside faces 6 of the prism and four on the inside faces 7 of the same, and the luster ware surfaces on the inside and outside are connected together by luster ware leads 2 as above described. Or the luster ware model for forming the sheet metal may be of hollow cylindrical form as in Figs. 4 5 and 6 (or may be a solid cylinder) with the luster ware surface on the outside between the lines 8, 9 and also if desired a luster ware surface extending on the inside (or only on the inside or only on the outside) so that when the metal is deposited on the luster ware surface to the required thickness the deposit can be removed either in the form of sheet metal or as tubes. In the latter case when the deposited tube is an exterior tube it will be polished on the inside through having been in contact with the glazed luster ware surface, and when formed by depositing on the interior of the model then it will through the same cause be polished on the outside. To facilitate the removal of the deposit on the exterior of the luster ware surface as aforesaid, the luster ware surface may be arranged to be not continued all around the model but to finish at the two parallel lines 10, 11 near one another and connected by leads 2 so that the deposit will finish at these lines 10 11, and can readily be pulled off the model when the leads 2 have been slit through. Moreover to facilitate the removal of the model from the deposit said model may, as will readily be understood, be made in two or more parts, for instance as shown by Fig. 6 which shows a cylindrical model made in halves 38, 39 which halves are each provided with flanges 40 so arranged that when the two halves are placed together and the flanges are in engagement, a complete hollow cylinder is formed while the halves can be readily disengaged to allow of the removal of the interior deposit after the exterior deposit has been removed from the exterior of the halves.

If the metal which is deposited on to the glazed metallic luster surface is required to have an embossed polished surface either continuous or perforated then the glazed surface of the model is simultaneously sunk or raised so that the metal deposited thereon will have a similar form and this applies equally well to the making of small articles such for instance as ornamental strip metal known as "wire", or finger plates, cabinet handle plates, coffin handle plates, panels for bedsteads and for other purposes and many other like articles which at the present time are made of sheet metal stamped in dies. For making ornamental strip metal whether perforated or not, similar luster ware models have to be used the luster surfaces corresponding with the metal strips to be produced as will readily be understood.

In order to produce an electro-deposited metal article such for instance as a teapot or a vase or other hollow vessel or article which is required to be hollow and polished on the outside, with or without a raised or sunk pattern thereon, the glass or potteryware or other said glazed luster surface model is made in one or more parts something like a core box with its inner surface or surfaces coated or partly coated with the glazed metallic luster. Such a model is shown for instance in Figs. 7 and 8 of which Fig. 7 is a front part sectional elevation of a set of luster ware molds for forming a teapot and Fig. 8 is a sectional plan of the same taken on line X X of Fig. 7. This particular model consists of the two halves B, C (each of which corresponds internally with one half of the teapot) and the top ring D which forms the seating for the lid, and the bottom circular block E which forms the usual depression 12 in the bottom of the teapot. The ring part D and the block E fit in the top and bottom of the half molds B, C as shown in Fig. 7. The model is coated with the metallic luster at the parts 12, 13, 14 and 15 corresponding with the bottom and body and handle and spout of the teapot where the metal is to be deposited, any suitable leads for the wires for the current being arranged as will readily be understood. The ring part D is also luster glazed at 16 corresponding with the seating for the lid. The parts B, C, D and E of the molds are fixed together by any suitable means. The anode supply and solution will pass through suitable openings such as the opening 17 in the spout and the opening 18 in the ring D. The molds can if desired and are by preference made hollowed on the outside so as to be light for handling and the exterior surface 19 is by preference covered with the said metallic luster glaze so as to have a certain amount of metal deposited thereon to strengthen the model, but this exterior metallic luster surface is stopped off at such points as not to be connected in any way with the internal metallic luster surface on to which the metal is being deposited to form the teapot, and thus when this external surface 19 has received the proper thickness of deposit for strengthening the mold that thickness is not increased.

In order to quicken the production a certain thickness of metal may be deposited on the internal luster surfaces of parts of the mold before they are placed together for the full weight of the metal to be deposited thereon. When the full weight has been deposited on the interior of the complete mold it is opened and the inclosed deposit which has not adhered to the metallic luster surface of the molds is free to be removed therefrom. Its exterior surface will be beautifully polished by contact with the smooth glazed metallic luster surface of the mold. When the parts of the mold have been washed and cleaned they are ready for the formation of another teapot in a similar way.

Both the handle and spout of the teapot formed as above described will be hollow but when the former is required to be solid then it can be filled in with any suitable metal or material from the interior of the pot. Or if preferred the body of the pot and the spout can be deposited together without the handle, but with sockets or parts to receive the handle, and then a solid handle or other suitable handle can be fixed to the body by any suitable means. It will be understood from the above description that many other metal articles can be produced in the manner above described by being deposited on the glazed metallic luster interior of mold made in two or more parts for the removal of the internal deposit which latter will have a beautifully polished surface as aforesaid. It will be understood that the molds require in some cases to have attachments or extended portions embodied in the production of the molds for the current connections and for fixing the molds together by any suitable means.

When the deposited metal teapot or other vessel is required to have a bright polished interior surface this is done by using a model which has the external shape of the required vessel and an external glazed metallic luster surface on to which the metal is deposited to form the required vessel. The model is, as will readily be understood, made in the necessary sections to enable it to be readily removed from the deposit.

In a similar manner I make metal molds which can be used for any purpose where a soft plastic material requires to be molded into shape. In making these molds I use a metallic luster ware article having the shape of the required article which is to be made from the molds and then on to the metallic luster surface on this article I deposit copper or other metal to form the mold, the said deposited metal being divided up into parts on its surface if necessary so that it will leave the metallic luster ware part on which it is deposited, and these parts of the metal mold thus made can be taken apart and when placed together will form a complete mold the interior surface of which will be bright and polished and an exact copy of the article from which the mold was made. When the said metal molds are required to be made with flanges or side edges to facilitate opening and closing, then this is done by making the glazed luster ware molds with projecting luster ware flanges on to which the metal will be deposited to form flanges on the deposited metal mold. For instance in the pair of glazed luster ware molds F, G indicated in cross sectional plan by Fig. 9 each of these half molds F, G is formed with projecting side flanges 20 which are coated with the glazed metallic luster at 21 so that the two deposits 22, 23 forming the metal half molds will each be formed with side flanges 20 as aforesaid. These molds Fig. 9 are for forming exterior deposits with internal polished surfaces. If the glazed luster ware half molds are such as indicated for instance by Fig. 10 and marked H, I, for forming the internal deposits 24, 25 with the external bright polished surfaces then each of the half molds H, I is formed with a metallic glazed luster surface which extends on to the faces 26 where the half molds meet so that the portions of the deposits 24, 25 which are deposited thereon will form the flanges 20 of the internal deposits 24, 25. Or as shown in sectional plan by Fig. 11 the luster ware mold for forming the two deposited metal half molds 22, 23 may be made as one mold J on the two sides or halves of which the metal half molds 22, 23 are deposited, this glazed luster ware mold J being made with the projecting side flanges 27, 28 which are made with the glazed metallic luster ware surfaces of the proper width to form the side flanges 20 on the metal half molds 22, 23 so that the two metal half molds 22, 23 will fit together and form a complete mold as in Fig. 12. The flanges 20 may be shaped in any desired form such as one flange having a projection 29 to fit into a corresponding depression 30 in the other flange as shown, so as to keep the deposited metal half molds 22, 23 in their proper positions relatively to one another when they are fitted together as in Fig. 12.

If the half mold, such for instance the half mold G in Fig. 9, is made perfectly true and equal sided, two of the deposits taken therefrom can be placed with their flanges face to face so as together to form the desired metal mold or other hollow article. Moreover I may simultaneously make two deposited metal articles from one glazed metallic luster ware mold one of the deposits being an internal deposit with a bright external surface, and the other deposit being an external deposit with a bright internal surface. This will be clear by an examination of Fig. 13 which is a sectional plan of a glazed metallic luster ware mold K with two deposits 31, 32 thereon. This glazed luster ware mold K has one hollow or concave side 33 on to which a deposit 31 has been made, and another rounded or convex side 34 on to which another deposit 35 has been made. The deposit 31 will have a bright polished external surface, and the deposit 34 will have a bright polished internal surface. It will be seen that a very large number of articles of many ornamental and other shapes and sizes can be formed together off the same mold which is formed with glazed luster ware surfaced parts to correspond with the various deposits which are to be produced thereon or therein. There is no glazed metallic luster on the periphery 36 of the mold K except the short bands at intervals forming leads from the internal deposit 31 to the external deposit 35.

As heretofore stated the deposit does not adhere to the glazed metallic luster surface but nevertheless the said deposit is readily fixed thereto if desired by the shape of the model being so arranged that when the model is required to remain as a permanent part of the finished article the deposit will then so embrace the model that the latter cannot be removed even if broken without first cutting the deposit. The pottery ware model may for instance have the glazed metallic luster surface inside and out including its edges and be absolutely inclosed and hidden inside the metal deposit, which thus will serve to strengthen the inclosed pottery ware model.

It will be seen that my invention is particularly applicable to making those metallic articles, and combined metallic and nonmetallic article, in which the metal part is deposited on to the model and the model or portions of the same is or are required to be broken away or otherwise removed from the deposit, as the coating of the surface or surfaces of the model with the said metallic luster glaze is very cheaply done by the potter in the preparation of the model and as aforesaid is practically everlasting as with the exception of washing and cleaning the surface does not have to be prepared in any way for the various deposits which are made on it.

It is to be understood that the platinum or other metal which is employed by the potter in forming the luster surface has to be of sufficient strength or quantity to carry the current, and owing to the fact that the platinum or other metal in the luster surface is burned and run into the glaze it cannot be taken up by the deposit and yet it presents a sufficient metallic surface to receive the deposit and convey the current, and the luster surface is so held and protected by the glaze that as aforesaid it is practically indestructible by the liquid contents of the various baths.

When it is desired for the deposit on the glazed metallic luster ware surface of the model to have a pattern or device on it, such pattern or device can be formed on the glazed luster ware surface of the model by sand blasting so as to show on the surface of the deposit and this pattern on the deposit can then be finished up or more clearly defined by engraving or chasing.

It will be understood from the foregoing description of my invention that my said invention is applicable to the manufacture by electro-deposition of any articles which can be produced by electro-deposition on the glazed metallic luster ware surface of a suitable model, either as an external deposit or as an internal deposit as aforesaid, such articles for instance as ornamental tubes and fender moldings, cornice poles and the like, ornamental spindles for bedsteads, bedstead vases, bedstead mounts, candlesticks candelabra, plaques, shields, finger plates, reflectors, dish covers, molds, statuary and any other articles which can be produced by electro-deposition into or onto a glazed luster ware surface or mold.

When the glazed luster ware model is to remain as a portion of the finished article, such for instance as a vase said article may have portions of the said glazed metallic luster ware surface stopped off so that when the metal is deposited on to the exposed portions of the luster ware surface a suitable metallic design will be formed on the luster ground. Also the article may be further ornamented by the surface of the metallic parts which have been deposited as aforesaid being stopped off and another metal deposited on to the exposed portions of the luster ware surface, which are the interstices between the first deposit, so that the result will be a metallic surface formed of two different metals.

The model or mold and the article produced by the deposition are not claimed herein but are made the subject matter of co-pending divisional applications Serial Nos. 577,434 and 577,435, respectively, filed August 16, 1910.

What I claim as my invention and desire to secure by Letters Patent is:—

The improved process of forming by electro-deposition a metallic vessel or other metallic article with a bright polished surface, consisting in electro-depositing metal on to a glazed metallic luster surface of a pottery-ware or glass model and subsequently removing the model from the deposit, substantially as described.

In testimony whereof I have signed my name to this specification in the presence of two subscribing witnesses.

FRANK IORNS GIBBS.

Witnesses:
 CHARLES BOSWORTH KELLEY,
 THOMAS JOHN ROWE.